(12) United States Patent
Hiramatsu et al.

(10) Patent No.: US 10,710,610 B2
(45) Date of Patent: Jul. 14, 2020

(54) DRIVING CONTROL METHOD AND DRIVING CONTROL APPARATUS

(71) Applicant: Nissan Motor Co., Ltd., Yokohama-shi, Kanagawa (JP)

(72) Inventors: Machiko Hiramatsu, Kanagawa (JP); Takashi Sunda, Kanagawa (JP); Hideaki Nemoto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/303,514

(22) PCT Filed: May 27, 2016

(86) PCT No.: PCT/JP2016/065737
§ 371 (c)(1),
(2) Date: Nov. 20, 2018

(87) PCT Pub. No.: WO2017/203694
PCT Pub. Date: Nov. 30, 2017

(65) Prior Publication Data
US 2019/0337530 A1 Nov. 7, 2019

(51) Int. Cl.
*B60W 50/14* (2020.01)
*G05D 1/00* (2006.01)
*B60W 50/00* (2006.01)

(52) U.S. Cl.
CPC .......... *B60W 50/14* (2013.01); *G05D 1/0088* (2013.01); *B60W 2050/0088* (2013.01);
(Continued)

(58) Field of Classification Search
CPC ................ B60W 50/14; B60W 50/10; B60W 2520/105; B60W 2050/0088;
(Continued)

(56) References Cited

U.S. PATENT DOCUMENTS 6,449,572 B1 9/2002 Kurz et al.
10,035,519 B2 * 7/2018 Minster .............. G01C 21/3461
(Continued)

FOREIGN PATENT DOCUMENTS

JP 2000231326 A 8/2000
JP 2001071833 A 3/2001
(Continued)

*Primary Examiner* — Michael J Zanelli
(74) *Attorney, Agent, or Firm* — Young Basile Hanlon & MacFarlane, P.C.

(57) ABSTRACT

A driving control method compares, in a vehicle capable of switching manual driving to run the vehicle according to driving operations of an occupant and automated driving to automatically run the vehicle from one to another, occupant's driving characteristics of manual driving in a present trip of the vehicle with reference driving characteristics stored in advance, and if a predetermined deviation occurs between the occupant's driving characteristics of manual driving in the present trip and the reference driving characteristics, sets driving characteristics applied to the automated driving according to the occupant's driving characteristics of manual driving in the present trip.

15 Claims, 13 Drawing Sheets

(52) U.S. Cl.
CPC .............. *B60W 2050/0089* (2013.01); *B60W 2050/146* (2013.01); *B60W 2510/18* (2013.01); *B60W 2520/105* (2013.01); *B60W 2554/801* (2020.02); *B60W 2556/00* (2020.02); *G05D 2201/0213* (2013.01)

(58) Field of Classification Search
CPC ... B60W 2050/0089; B60W 2050/146; B60W 2600/00; B60W 2510/18; B60W 2201/0213; B60W 2550/308; B60W 2040/0881
See application file for complete search history.

(56) References Cited

U.S. PATENT DOCUMENTS

| | | | |
|---|---|---|---|
| 10,077,056 B1* | 9/2018 | Fields ................... | B60W 40/09 |
| 2014/0162219 A1* | 6/2014 | Stankoulov .......... | G09B 19/167 |
| | | | 434/65 |
| 2017/0329330 A1* | 11/2017 | Hatano ................ | B62D 15/025 |
| 2018/0259956 A1* | 9/2018 | Kawamoto ........... | B60W 40/09 |

FOREIGN PATENT DOCUMENTS

| | | | |
|---|---|---|---|
| JP | 2009110184 A | 5/2009 |
| JP | 2010198120 A | 9/2010 |
| JP | 2012051395 A | 3/2012 |
| JP | 2015089801 A | 5/2015 |
| JP | 2016020177 A | 2/2016 |

* cited by examiner

FIG. 9

| RUNNING SCENE | DEFINITION |
|---|---|
| S1: HIGHWAY | ORDINARY ROAD OF FOUR LANES OR MORE |
| S2: NON-HIGHWAY 1 | ORDINARY ROAD OF TWO LANES |
| S3: NON-HIGHWAY 2 | ORDINARY ROAD WITHOUT LANE MARKS |
| S4: EXPRESSWAY | EXPRESSWAY OR TOLL ROAD |

FIG. 10

| RUNNING STATE | DEFINITION | PARAMETER | RECORDING CYCLE | NUMBER OF DATA (MINIMUM) |
|---|---|---|---|---|
| B1: CRUISE | NO PRECEDING CAR, BRAKE OFF, ACCELERATION LESS THAN 0.05 G | VELOCITY V | EVERY SEC. | 10000 (100) |
| B2: FOLLOW | PRECEDING CAR, BRAKE OFF, ACCELERATION LESS THAN 0.05 G | TIME HEADWAY THW (TIME HEAD WAY) = DISTANCE / VELOCITY | EVERY SEC. | 10000 (100) |
| B3: DECELERATION-1 | NO PRECEDING CAR, BRAKE ON | BRAKING TTI (TIME TO INTERSECTION) = DISTANCE / VELOCITY | EVERY BRAKING | 1000 (10) |
| B4: DECELERATION-2 | PRECEDING CAR, BRAKE ON | BRAKING TTC (TIME TO COLLISION) = DISTANCE / RELATIVE VELOCITY | EVERY BRAKING | 1000 (10) |
| B5: ACCELERATION-1 | NO PRECEDING CAR, BRAKE OFF, ACCELERATION 0.05 G OR OVER | ACCELERATION A1 | EVERY ACCELERATION | 1000 (10) |
| B6: ACCELERATION-2 | PRECEDING CAR, BRAKE OFF, ACCELERATION 0.05 G OR OVER | ACCELERATION A2 | EVERY ACCELERATION | 1000 (10) |

DRIVING CONTROL METHOD AND DRIVING CONTROL APPARATUS

TECHNICAL FIELD

The present invention relates to, in a vehicle capable of switching manual driving and automated driving from one to another, a driving control method and an apparatus thereof to set driving characteristics applied to the automated driving.

BACKGROUND

Conventionally, there is a driving control apparatus disclosed in Patent Literature 1 that carries out automated driving in a state to alleviate an odd feeling given to a driver. The driving control apparatus disclosed in the Japanese Unexamined Patent Application Publication No. 2015-89801 learns, in association with a driving environment, driving operations conducted by the driver during manual driving, refers to a learnt result, and executes the automated driving.

However, the driving characteristics learnt during the past manual driving may differ from driving characteristics desired by the occupant of the vehicle in a present trip. In such a case, the above-mentioned driving control apparatus of the related art feeds the learnt result of the past manual driving to the automated driving, and therefore, there is a problem that the automated driving is carried out based on the driving characteristics differing from those desired by the occupant.

SUMMARY

Accordingly, the present invention proposes, in consideration of the above-mentioned circumstances, a driving control method and an apparatus thereof capable of executing automated driving according to driving characteristics desired for a present trip by vehicle's occupant.

In order to solve the above-mentioned problem, a driving control method and an apparatus thereof according to an aspect of the present invention compare, in a vehicle capable of switching manual driving to drive the vehicle under driving operations of an occupant and automated driving to automatically drive the vehicle from one to another, occupant's driving characteristics of manual driving in a present trip of the vehicle with reference driving characteristics stored in advance. If a predetermined deviation occurs between the occupant's driving characteristics of manual driving in the present trip and the reference driving characteristics, driving characteristics applied to the automated driving are set according to the occupant's driving characteristics of manual driving in the present trip.

According to the present invention, automated driving in a present trip can be carried out according to driving characteristics desired by an occupant of a vehicle.

BRIEF DESCRIPTION OF THE DRAWINGS

FIG. 9 is a view explaining a classification technique of running scenes in the driving characteristics determination process according to the first embodiment of the present invention;

FIG. 10 is a view explaining a classification technique of running states in the driving characteristics determination process according to the first embodiment of the present invention;

DETAILED DESCRIPTION

First Embodiment

Hereunder, a first embodiment according to the present invention will be explained with reference to the drawings.

[Configuration of Driving Control System]

Figure 1:
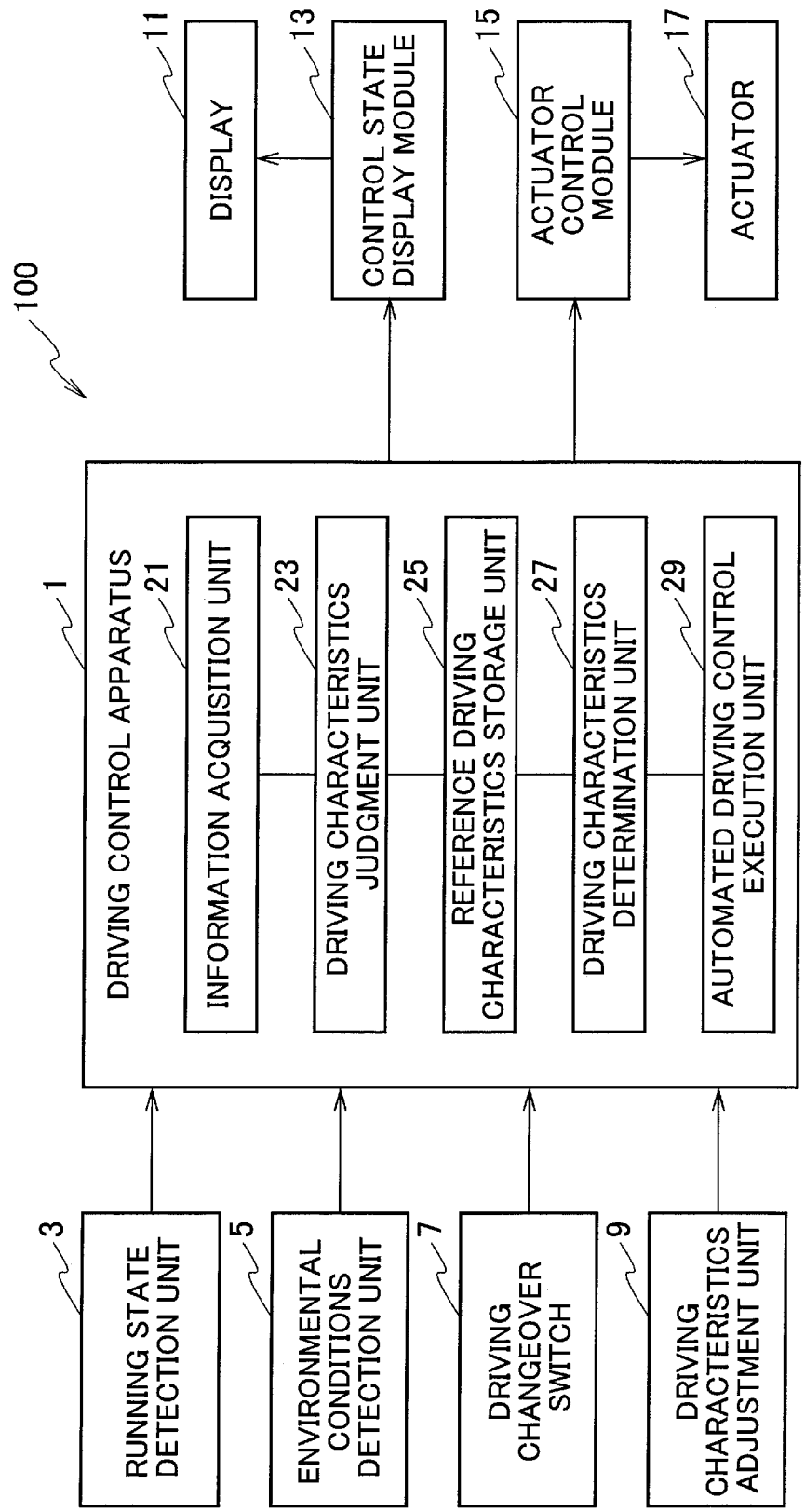
FIG. 1 is a block diagram illustrating a configuration of a driving control system including a driving control apparatus according to a first embodiment of the present invention.
Figure 2:
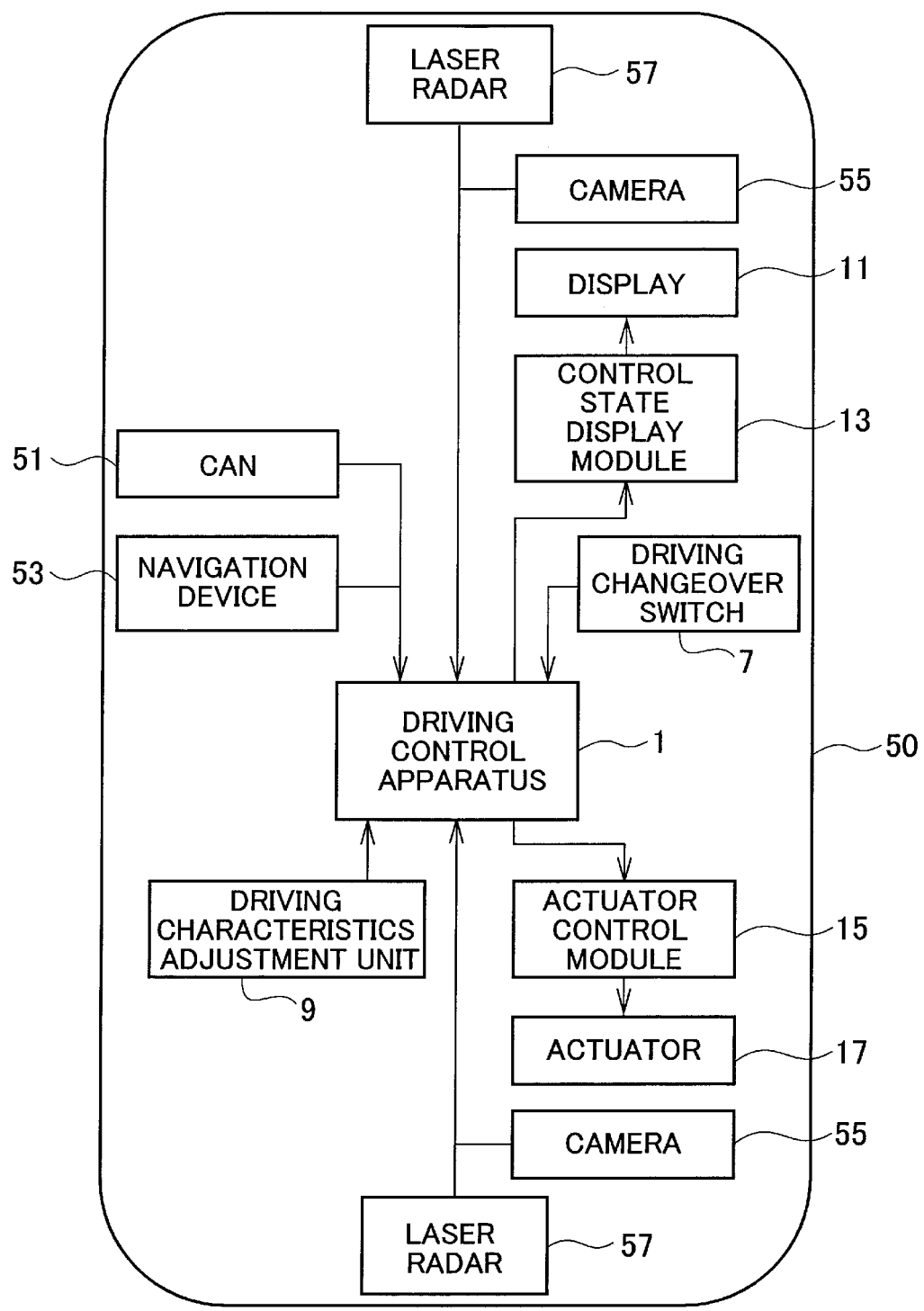
FIG. 2 is a block diagram illustrating a concrete hardware configuration of the driving control system including the driving control apparatus according to the first embodiment of the present invention.
Figure 3:
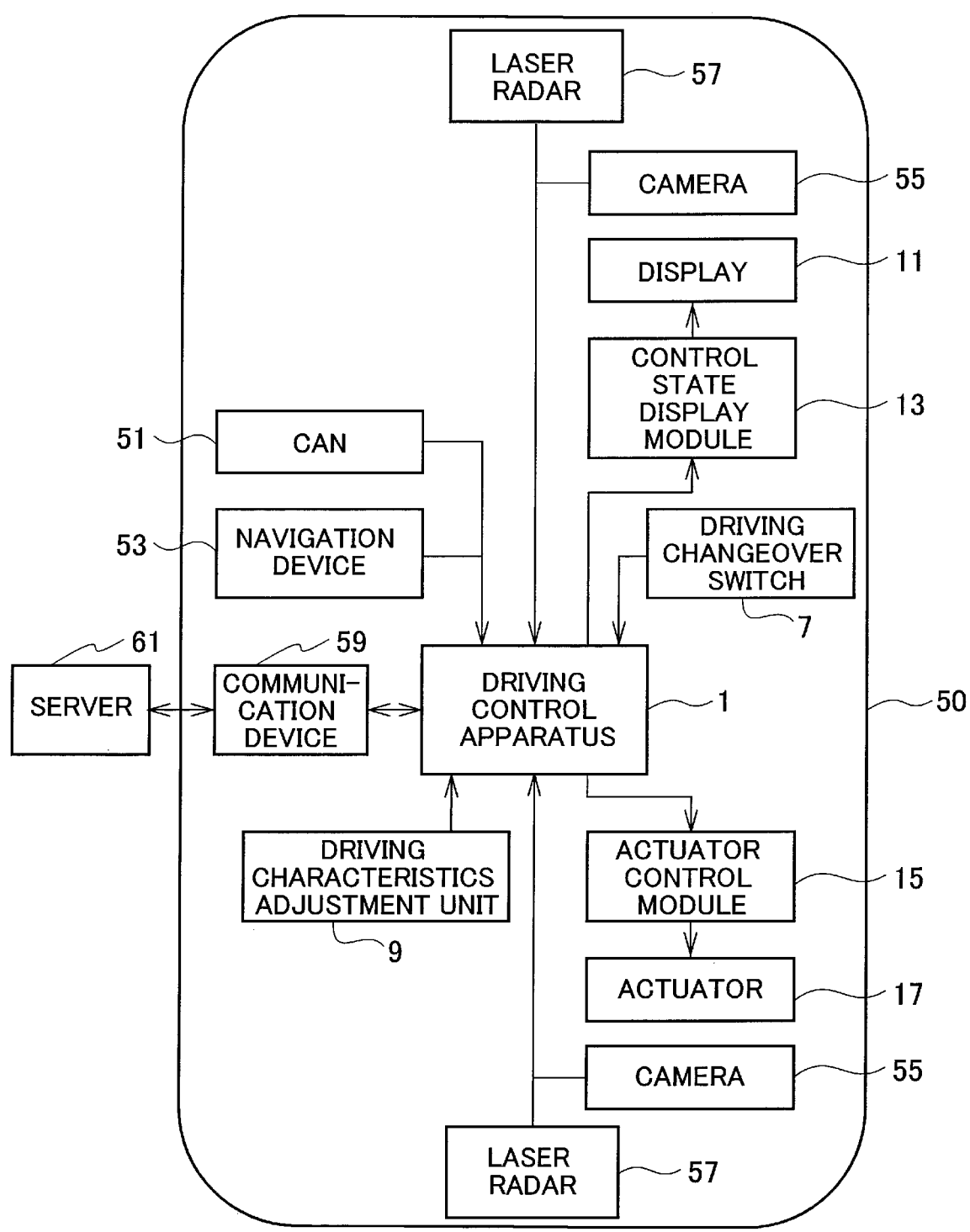
FIG. 3 is a block diagram illustrating a concrete hardware configuration of the driving control system including the driving control apparatus according to the first embodiment of the present invention.

FIG. 1 is a block diagram illustrating a configuration of a driving control system including a driving control apparatus according to this embodiment. Also, FIGS. 2 and 3 are block diagrams illustrating concrete hardware configuration examples of the driving control system including the driving control apparatus according to the embodiment. As illustrated in FIG. 1, the driving control system 100 according to the embodiment includes the driving control apparatus 1, a running state detection unit 3, an environmental conditions detection unit 5, a driving changeover switch 7, a driving characteristics adjustment unit 9, and a display 11. Further, the driving control system 100 is connected to a control state display module 13, an actuator control module 15, and an actuator 17 which are installed in a vehicle.

In the vehicle which is capable of switching manual driving and automated driving from one to another, the driving control apparatus 1 is a controller that carries out a driving characteristics determination process to determine driving characteristics applied to the automated driving. In particular, the driving control apparatus 1 compares occupant's driving characteristics of manual driving in a present trip of the vehicle with reference driving characteristics stored in advance. If a predetermined deviation occurs between the occupant's driving characteristics of manual driving in the present trip and the reference driving characteristics, driving characteristics applied to the automated driving are set according to the occupant's characteristics of manual driving in the present trip. Here, the manual driving means to drive the vehicle according to driving operations of the occupant and the automated driving means to drive the vehicle without occupant's driving operations. The occupant's driving characteristics of manual driving may be driving operation quantities (an acceleration quantity, a steering quantity, and the like) as they are, or may be obtained from the occupant's operation quantities. Alternatively, the occupant's driving characteristics of manual driving may be behavior of the vehicle (velocity, acceleration, yaw rate, and the like) as they are. The manual driving is not necessarily a state that the occupant is operating all of operation parts (for example, an accelerator, a brake, a steering wheel, a constant velocity setter/controller, a wiper controller, and a headlight controller) to be operated by occupant. If some of the operation parts to be operated by occupant to drive the vehicle is operated, the operated part is in the state of manual driving, and those not operated are in the state of automated driving. In this way, the state of manual driving or automated driving may be set operation part by operation part. The driving control apparatus 1 includes an information acquisition unit 21, a driving characteristics judgment unit 23, a reference driving characteristics storage unit 25, a driving characteristics determination unit 27, and an automated driving control execution unit 29, and as illustrated in FIG. 2, is installed in the vehicle 50. Alternatively, as illustrated in FIG. 3, the vehicle 50 may be provided with a communication device 59 and a server 61 to store data. In particular, data for the manual driving of the vehicle 50 is large in quantity, and therefore, is better to be stored in the server 61. Further, the driving control apparatus 1 may be arranged in the server 61. Data concerning driving characteristics is not always required to be stored nor reflected to the reference driving characteristics. The reference driving characteristics are set vehicle by vehicle and may not be updated. For example, it is possible to compare data acquired in real time in a present trip with the reference driving characteristics, thereby judging whether or not there is a predetermined deviation between the driving characteristics of the present trip and the reference driving characteristics. However, accumulating acquired data and reflecting the accumulated data to the reference driving characteristics may result in making the reference driving characteristics a suitable judgment reference for the occupant. This enables to judge whether the occupant's driving characteristics of manual driving in a present trip are usual ones or unusual ones of the occupant. Namely, a judgment suited for a given occupant can be achieved.

The running state detection unit 3 is to detect running state indicating data of the vehicle 50 such as velocity, steering angle, and acceleration and is, for example, a vehicle-mounted network such as a CAN (Controller Area Network) 51 or a navigation device 53.

The environmental conditions detection unit 5 is to detect environmental conditions indicating data of the vehicle 50 such as a vehicle-to-vehicle distance to a preceding vehicle, the position of a parked vehicle, and a distance to an intersection and includes, for example, a camera 55, a laser radar 57, and the navigation device 53 which are mounted on the vehicle. In addition, it is possible to employ a sonar, vehicle-to-vehicle communication, or road-to-vehicle communication to detect the environmental conditions.

The driving changeover switch 7 is a switch installed in the vehicle and operated by the occupant of the vehicle, to change automated driving and manual driving from one to another. The driving characteristics adjustment unit 9 is an operation switch mounted on the vehicle to receive an input from the occupant of the vehicle so as to adjust driving characteristics for automated driving. For example, an input to adjust vehicle velocity or vehicle-to-vehicle distance for automated driving is received from the occupant of the vehicle. The driving characteristics adjustment unit 9 may always display, on a meter, driving characteristics parameters set at present, or may display them in response to a request from the driver. The occupant of the vehicle is able to adjust respective parameters before starting automated driving or during the same. The occupant may set the parameters from a parameter setting menu. The driving characteristics adjustment unit 9 may be, for example, an operation button arranged on the steering wheel or an operation button or a touch pad arranged on a center console.

The display 11 displays a controlling state of a driving characteristics determination process conducted by the driving control apparatus 1. For example, driving characteristics at the time of automated driving such as a vehicle velocity and a vehicle-to-vehicle distance are provided for the driver. At the time of switching manual driving to automated driving, if the occupant of the vehicle chooses driving characteristics, the chosen driving characteristics are displayed. The display 11 may be a display screen of the navigation device 53 or a head-up display. The control state display module 13 carries out processes of detecting a controlled state during the execution of automated driving from the driving control apparatus 1 and displaying the same on the display 11.

The actuator control module 15 carries out processes of acquiring automated driving control outputs from the driving control apparatus 1 and driving the various actuators 17 installed in the vehicle. The actuators 17 are drive units arranged to drive parts such as an accelerator, a brake, and a steering wheel of the vehicle 50.

Units forming the driving control apparatus 1 will be explained. The information acquisition unit 21 acquires data concerning a running state of the vehicle 50 detected by the running state detection unit 3 and data concerning environmental conditions of the vehicle 50 detected by the environmental conditions detection unit 5. Specifically, the information acquisition unit 21 acquires, as a running state of the vehicle 50, data such as velocity, brake timing, and acceleration. Also, it acquires, as environmental conditions of the vehicle 50, a vehicle-to-vehicle distance, time headway, and relative velocity with respect to a preceding vehicle, a gap time with respect to an oncoming vehicle or a crossing vehicle, a sideward distance to a parked or stopped vehicle, and a sideward-following-vehicle distance and time with respect to a sideward-following vehicle.

The driving characteristics judgment unit 23 uses the data acquired by the information acquisition unit 21, accumulates manual driving data in a present trip of the vehicle, and judges driving characteristics of the present trip. At this time, the driving characteristics judgment unit 23 is set not to use data accumulated just after the start of running of the vehicle, e.g., data accumulated within a fourth predetermined time after the start of running. Just after the start of running of the vehicle, driving characteristics are unstable, and therefore, data after driving characteristics become stable are used. For example, the driving may start from a home or a company positioned away from a highway. The home or company may be in an area where buildings are concentrated. In such an area, roads may be narrow and there may be many intersections. Then, the number of acceleration and deceleration actions and the number of right and left turns will be large, to unable the detection of stable data. Further, if the driving starts from a place near an expressway or a highway, the driving characteristics of the vehicle must be adjusted to the traffic of the expressway or highway. In such a case, acceleration, deceleration, and lane change are required to unable the detection of stable data. Accordingly, the fourth predetermined time is set to a time in which the driving characteristics of the vehicle become stable. In this case, data may be accumulated when the fourth predetermined time elapses after the start of running, or may be accumulated after the start of running with data accumulated before elapsing the fourth predetermined time being discarded.

The manual driving data accumulated for judging the driving characteristics of the present trip is at least one among a vehicle velocity, a vehicle-to-vehicle distance, time headway, or relative velocity between the vehicle and a preceding vehicle, a brake timing of the vehicle, and an acceleration of the vehicle. Further, it is possible to include any one of a gap time between the vehicle and an oncoming vehicle or a crossing vehicle, a sideward-following-vehicle distance or time between the vehicle and a sideward-following vehicle, and a sideward distance between the vehicle and a parked or stopped vehicle.

Figure 4:
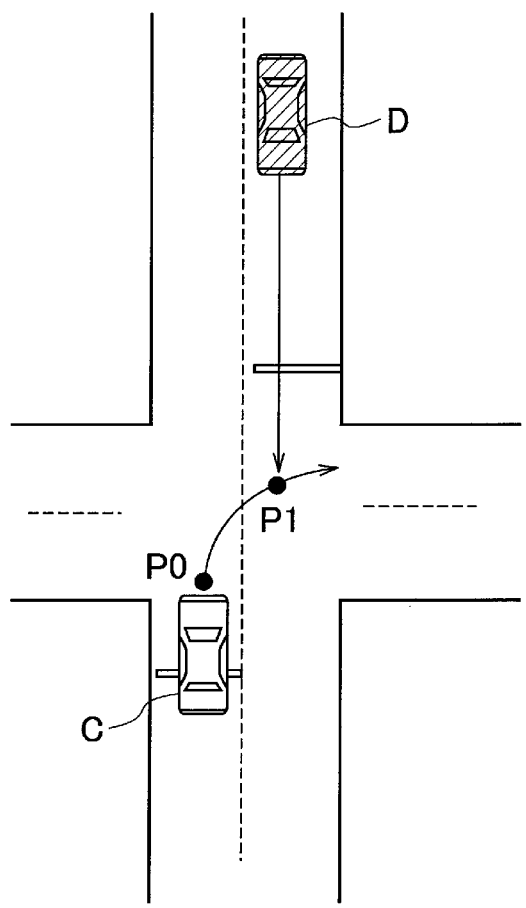
FIG. 4 is a view explaining a gap time at the start of a right turn at an intersection.

Among them, the gap time is a temporal difference between the vehicle and a straightly oncoming vehicle when the vehicle starts a right turn at an intersection, or a temporal difference between the vehicle and a crossing vehicle when the vehicle starts a right turn at an intersection where a stop restriction is imposed. With reference to FIG. 4, the gap time when the vehicle starts a right turn at an intersection will be explained. As illustrated in FIG. 4, a right turn start point is P0 and a point where the own vehicle C and a straightly oncoming vehicle D cross each other is P1. An estimated arrival time of the straightly oncoming vehicle D from a running position thereof at the time when the own vehicle C reaches the point P0 to the point P1 is the gap time between the own vehicle and the straightly oncoming vehicle.

Figure 5:
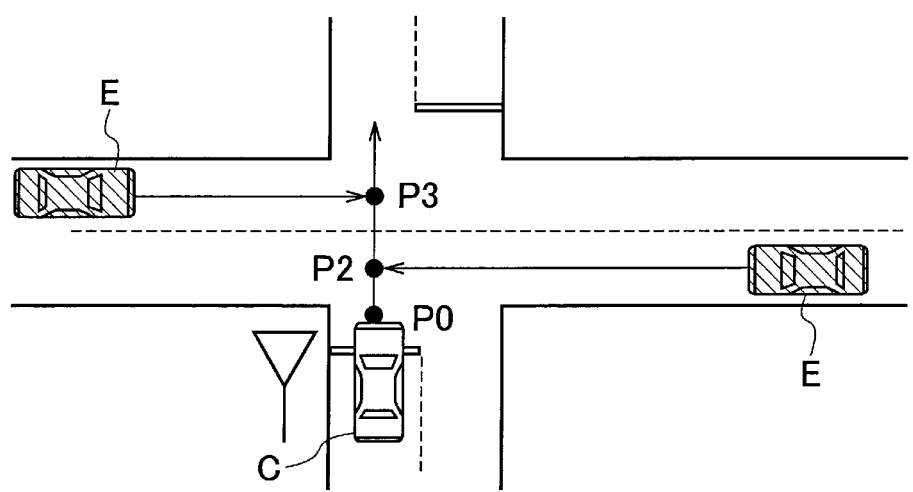
FIG. 5 is a view explaining a gap time at the time of entering an intersection where a stop restriction is imposed.

With reference to FIG. 5, the gap time when the vehicle enters an intersection where a stop restriction is imposed will be explained. As illustrated in FIG. 5, a point where the own vehicle C starts to enter the intersection is P0 and a point where the own vehicle C crosses a crossing vehicle E is P2 or P3. An estimated arrival time of the crossing vehicle E from a running position thereof at the time when the own vehicle C reaches the point P0 to the point P2 or P3 is the gap time between the own vehicle and the crossing vehicle.

Figure 6:
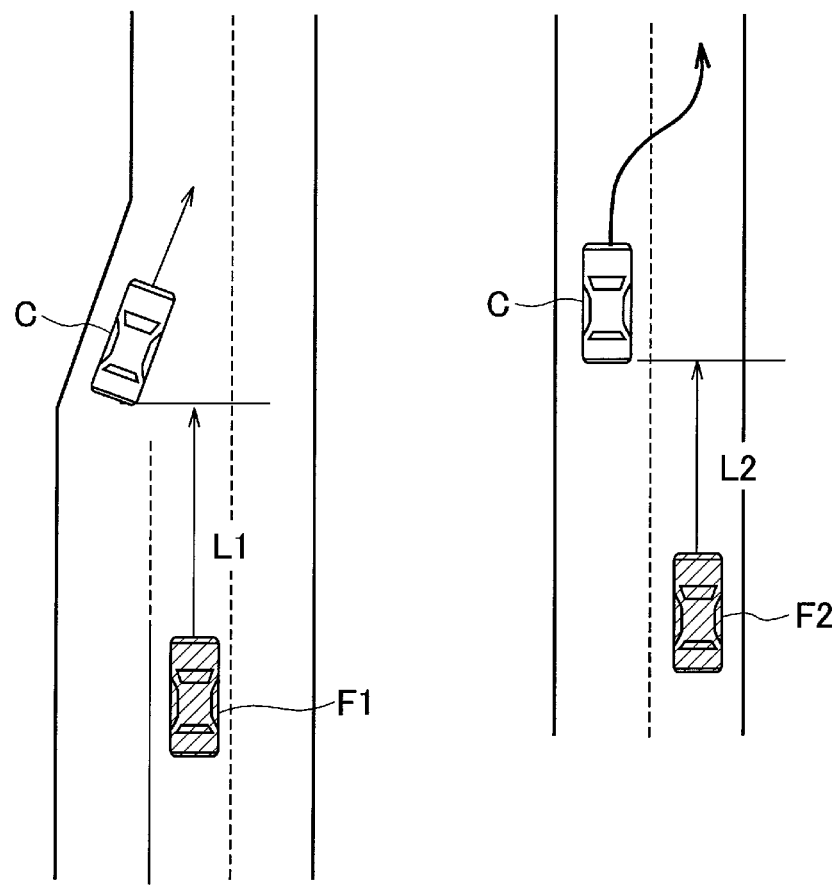
FIG. 6 is a view explaining a sideward-following-vehicle distance between an own vehicle and a following vehicle running in the next lane.
Figure 7:
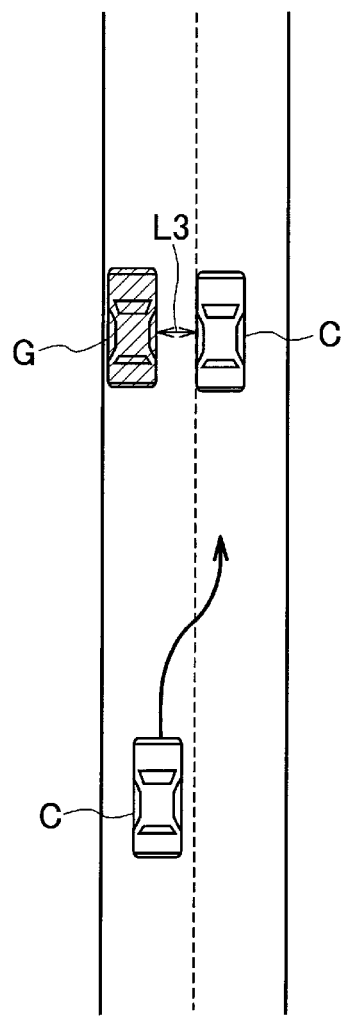
FIG. 7 is a view explaining a sideward distance between the own vehicle and a parked or stopped vehicle.

With reference to FIG. 6, a sideward-following-vehicle distance between the own vehicle and a sideward-following vehicle will be explained. As illustrated in FIG. 6, when the own vehicle C joins and enters a main lane of an expressway or a highway, a vehicle F1 running in the main lane is the sideward-following vehicle and a distance L1 is the sideward-following-vehicle distance. When the own vehicle C running on a single road changes a lane, a running vehicle F2 in the lane to which the own vehicle C is going to change is the sideward-following vehicle and a distance L2 is the sideward-following-vehicle distance. As illustrated in FIG. 7, when the own vehicle C on a single road passes by a parked or stopped vehicle G, a distance between the own vehicle C and the parked or stopped vehicle G is a sideward distance L3.

A history of operations inputted by the occupant through the driving characteristics adjustment unit 9 to adjust driving characteristics is also accumulated running scene by scene and running state by state as data to judge the driving characteristics of a present trip. Automated driving parameters are set driver by driver according to past driving characteristics and present driving characteristics. Even so, running by automated driving does not always conform to a driver's intention. Such a case occurs when, for example, the driver runs a running scene not experienced in the past driving, conditions of the driver change during automated driving, or the driver changes a desiring mode during automated driving. For example, such a case occurs when a need to hurry dissipates, or on the contrary, when a need to hurry arises. In such a case, based on the history of operations inputted by the occupant through the driving characteristics adjustment unit 9, driving characteristics are adjusted to those intended by the occupant. When running a running scene not experienced in the past driving, operation history data of the occupant is accumulated for the running scene and running state, so that the data is utilized for setting driving characteristics for the running scene from the next time. If conditions of the driver change during automated driving, operation history data of the occupant is accumulated in connection with the conditions of the driver, to reduce the number of operations to be carried out later. If a mode expected by the driver is changed during automated driving, operation history data of the occupant is accumulated in connection with the set mode such as hurry, normal, or slow, so that expected driving parameters are accurately set for each mode during automated driving.

The reference driving characteristics storage unit 25 stores in advance reference driving characteristics applied to automated driving. For example, the reference driving characteristics storage unit 25 accumulates data concerning manual driving in past trips of the vehicle, and according to the accumulated data, sets the reference driving characteristics. The data accumulated for generating the reference driving characteristics is similar to the data accumulated for judging the driving characteristics of a present trip. The reference driving characteristics are generated and stored running scene by running scene and running state by running state for each parameter such as velocity and acceleration. The reference driving characteristics storage unit 25 may learn the accumulated data and set the reference driving characteristics, or may conduct weighted averaging to weight newer data heavier and set the reference driving characteristics accordingly. Also, it is possible to set the reference driving characteristics in connection with positional information and driving environments. For example, the reference driving characteristics are generated point by point on a map. In this case, the generated reference driving characteristics may reflect the road conditions of each point. For example, for a point where a road traffic is light, a parameter such as velocity may be set to a higher value.

The driving characteristics determination unit 27 compares the driving characteristics of the present trip with the reference driving characteristics, and if a predetermined deviation occurs between the driving characteristics of the present trip and the reference driving characteristics, sets according to the driving characteristics of the present trip driving characteristics applied to automated driving. For example, when the vehicle is usually run by the driver alone, the velocity and acceleration of the vehicle are relatively high. However, the driver may want to run this trip by relatively dropping the velocity and acceleration because there is an elderly or infant passenger in the vehicle. In such a case, the driving characteristics of manual driving of the occupant in this trip such as the velocity and acceleration of the vehicle tend to be lowered. As a result, a deviation occurs between the driving characteristics of manual driving of the occupant in this trip and the reference driving characteristics. If the deviation occurs, automated driving is carried out according to the driving characteristics of the present trip, thereby realizing the driver intended automated driving. At this time, the driving characteristics determination unit 27 may set the driving characteristics of the present trip as they are as the driving characteristics of the automated driving, or may set driving characteristics close to the driving characteristics of the present trip as the driving characteristics of the automated driving. Alternatively, if the occupant of the vehicle operates the driving characteristics adjustment unit 9, the operation is accepted to adjust the driving characteristics applied to the automated driving.

The automated driving control execution unit 29 determines, for a driving route set according to a destination inputted by the occupant of the vehicle, a running behavior of the vehicle according to the environmental conditions acquired by the information acquisition unit 21. The automated driving control execution unit 29 executes control of the vehicle according to the determined vehicle behavior. Namely, in the vehicle, a destination is set, a route is generated, a behavior is determined according to an environmental recognition result, and according to the determined behavior, automated driving control is executed. Once the vehicle behavior is determined, it is possible to set a target path of the vehicle and control the vehicle so as to follow the target path. The driving characteristics of manual driving in the present trip may be used as indexes to determine the vehicle behavior. In addition, the driving characteristics of manual driving in the present trip may be used when executing control of the vehicle. When executing the vehicle control, the driving characteristics may be reflected to a target value, an upper limit value, a gain, or filter variables. Further, the automated driving control execution unit 29 executes automated driving when an automated driving section is reached, or when the occupant of the vehicle selects the automated driving. At this time, the automated driving control execution unit 29 executes the automated driving according to the driving characteristics set by the driving characteristics determination unit 27. Also, the driving characteristics may be adjusted according to whether or not there is a passenger in the vehicle, or according to the attributes of a passenger. It is also possible to adjust the driving characteristics according to physical conditions of the driver, or according to a desired destination arrival time inputted by the occupant of the vehicle.

The driving control apparatus 1 is constituted with general-purpose electronic circuits including microcomputers, microprocessors, and CPUs and peripheral devices such as memories. It executes specific programs to operate as the above-mentioned information acquisition unit 21, driving characteristics judgment unit 23, reference driving characteristics storage unit 25, driving characteristics determination unit 27, and automated driving control execution unit 29. These functions of the driving control apparatus 1 may be arranged as one or a plurality of processing circuits. The processing circuits include, for example, programmed processing devices such as electric-circuit-containing processing devices. They also include application specific integrated circuits (ASICs) and conventional circuit parts arranged to execute the functions stipulated in the embodiment.

[Steps of Driving Characteristics Determination Process]

Next, steps of the driving characteristics determination process achieved by the driving control apparatus 1 according to this embodiment will be explained with reference to a flowchart of FIG. 8. The driving characteristics determination process illustrated in FIG. 8 starts when an ignition of the vehicle is turned on to start a present trip. The trip is a run from the turn-on of the ignition of the vehicle to the turn-off thereof. Even if the ignition is once turned off in the middle of the trip to a destination, the trip from a departure point to the destination may be deemed as a single trip.

Figure 8:
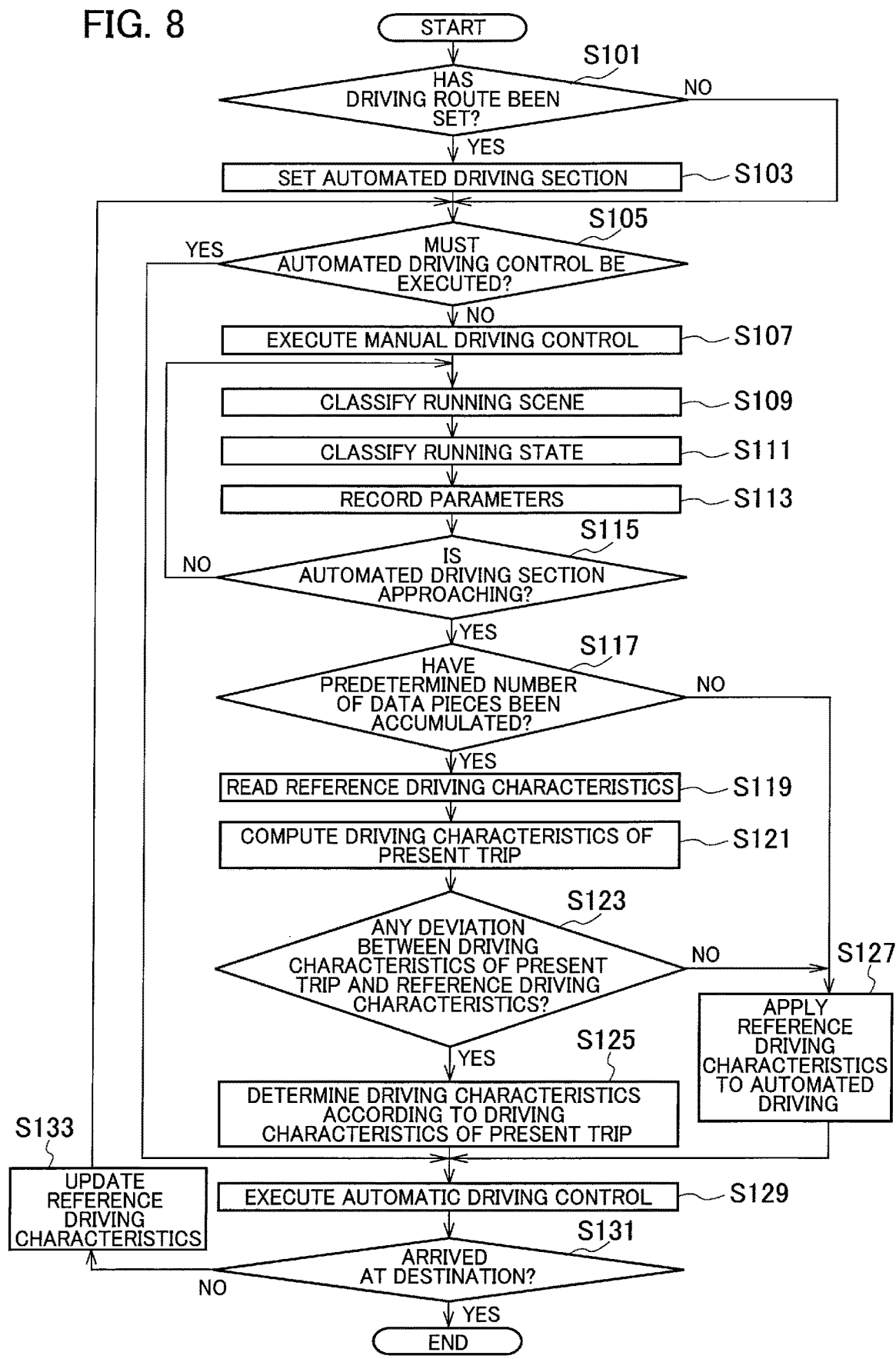
FIG. 8 is a flowchart illustrating processing steps of a driving characteristics determination process performed by the driving control apparatus according to the first embodiment of the present invention.

As illustrated in FIG. 8, first in step S101, the information acquisition unit 21 acquires information from the navigation device 53 and judges whether or not the occupant of the vehicle has inputted a destination and whether or not a driving route has been set. If the driving route has been set, the process advances to step S103, and if the driving route has not been set, to step S105.

In step S103, the automated driving control execution unit 29 detects, on the set driving route, a section where automated driving is possible and sets an automated driving section. The automated driving section is set according to the destination set by the driver and map information and is, for example, a highway, an expressway, a road with two or more lanes, or a road having a past record of automated driving.

In step S105, the automated driving control execution unit 29 judges whether or not automated driving must be executed. The automated driving control execution unit 29 determines to execute the automated driving if the vehicle is already in the automated driving section or if the occupant of the vehicle operates the driving changeover switch 7 and chooses the automated driving and the process advances to step S129. On the other hand, in the other case, it is determined to execute manual driving and step S107 is carried out.

In step S107, the automated driving control execution unit 29 does not execute automated driving and sets manual driving. As a result, a manual operation by the driver of the vehicle starts to run the vehicle.

In step S109, the driving characteristics judgment unit 23 classifies a running scene (running environment) in which the vehicle is presently running. For example, the driving characteristics judgment unit 23 obtains road map information from the navigation device 53 and analyzed information of images from the camera 55, and according to the information, classifies the running scene into one of four road types S1 to S4 illustrated in FIG. 9. In FIG. 9, the running scene S1 is a road type of highway and is chosen when the vehicle is running on an ordinary road with four lanes or more. The running scene S2 is a road type of non-highway-1 and is chosen when the vehicle is running on an ordinary road with two lanes. The running scene S3 is a road type of non-highway-2 and is chosen when the vehicle is running on an ordinary road without lane marks. The running scene S4 is a road type of expressway and is chosen when the vehicle is running on an expressway or a toll road. Although FIG. 9 classifies ordinary roads based on the number of lanes, it is possible to classify them based on lane widths. Also, it is possible to classify running scenes according to things other than the road types.

In step S111, the driving characteristics judgment unit 23 classifies a running state in which the vehicle is presently running. For example, the driving characteristics judgment unit 23 classifies the running state according to information such as whether there is a preceding vehicle or not, the brake is ON or OFF, or the degree of acceleration into one of six running states B1 to B6 illustrated in FIG. 10. As illustrated in FIG. 10, the running state B1 is a running state in which the vehicle is cruising and is chosen if there is no preceding vehicle, the brake is OFF, and the degree of acceleration is less than 0.05 G. The running state B2 is a running state in which the vehicle follows another vehicle and is chosen if there is a preceding vehicle, the brake is OFF, and the degree of acceleration is less than 0.05 G. The running state B3 is a running state of deceleration-1 and is chosen if there is no preceding vehicle and the brake is ON. The running state B4 is a running state of deceleration-2 and is chosen if there is a preceding vehicle and the brake is ON. The running state B5 is a running state of acceleration-1 and is chosen if there is no preceding vehicle, the brake is OFF, and the degree of acceleration is 0.05 G or over. The running state B6 is a running state of acceleration-2 and is chosen if there is a preceding vehicle, the brake is OFF, and the degree of acceleration is 0.05 G or over. Instead of the degree of acceleration, it is possible to use whether or not the opening of an accelerator is 20% or over as a threshold value.

In step S113, the driving characteristics judgment unit 23 records specified parameters for the running scene classified in step S109 and the running state classified in step S111. For example, if the vehicle is running on an expressway in a running state of following a preceding vehicle, the running scene is recorded as S4 and the running state as B2. In addition, as a parameter of the running state B2, a time headway is recorded as illustrated in FIG. 10. In other cases, if the running state is B1 of cruise, a velocity is recorded as illustrated in FIG. 10, and if the running state is B3 of deceleration-1, a braking TTI (Time To Intersection: a time up to a stop line at an intersection) is recorded. If the running state is B4 of deceleration-2, a braking TTC (Time To Collision: =vehicle-to-vehicle distance/relative velocity) is recorded, and if the running state is B5 of acceleration-1 or B6 of acceleration-2, an acceleration degree is recorded as a parameter. Recording cycles to record the parameters are as illustrated in FIG. 10.

In step S115, the automated driving control execution unit 29 judges if the vehicle is approaching the automated driving section. If not approaching the automated driving section, the process returns to step S109 to continuously carry out manual driving and accumulate data. If approaching the automated driving section, the process advances to step S117.

In step S117, the driving characteristics judgment unit 23 judges whether or not parameter data pieces of each of the running scenes and running states have been accumulated to specified minimum numbers. For example, as illustrated in FIG. 10, in the case of the running state B1, it is judged if the number of accumulated data pieces on the parameter of velocity is equal to a minimum, i.e., 100 or more. It is possible, however, not to use data accumulated just after the start of running of the vehicle, e.g., within a fourth predetermined time after the start of running. If the number of data pieces accumulated on at least one parameter of at least one running scene or running state is equal to a minimum or more, step S119 is carried out. On the other hand, if the number of accumulated data pieces on any parameter of any running scene or running state is less than the minimum, step S127 is carried out.

Figure 11:
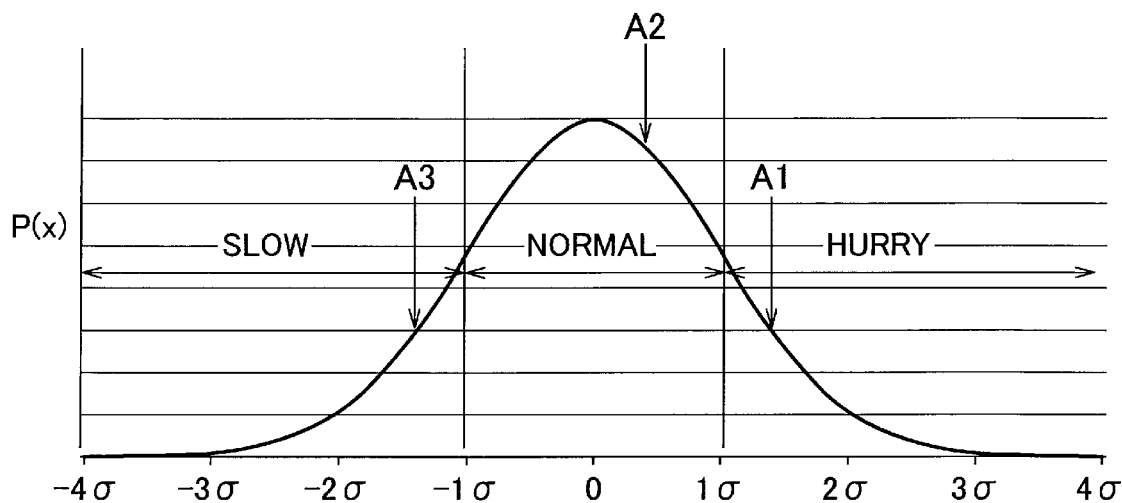
FIG. 11 is a view explaining a technique of judging a deviation between driving characteristics of a present trip and reference driving characteristics in the driving characteristics determination process according to the first embodiment of the present invention.

In step S119, the driving characteristics judgment unit 23 reads reference driving characteristics stored in advance in the reference driving characteristics storage unit 25. In more detail, the driving characteristics judgment unit 23 reads average values and standard deviations of the reference driving characteristics of the running scenes and running states. The reference driving characteristics are expressed with a probability distribution as illustrated in FIG. 11, the probability distribution being generated and stored for each parameter of each running scene and running state. For example, FIG. 11 is reference characteristics for the running scene S1 of highway and running state B1 of cruise with the parameter thereof being velocity V.

In step S121, the driving characteristics judgment unit 23 uses data accumulated during the present trip to compute statistics of the driving characteristics of the present trip. The numbers of data pieces used at this time are those illustrated in FIG. 10. For example, in the case of the running state B1, 10000 data pieces at the maximum are used. The driving characteristics judgment unit 23 computes the average value and standard deviation $\sigma$ of each parameter of each of the running scenes and running states in the present trip and finds a distribution position that indicates a deviation of the computed average value from the average value of the reference driving characteristics. For example, as illustrated in FIG. 11, an average value A1 in the present trip can be found at a distribution position $+1.5\sigma$ of the reference driving characteristics. Similarly, an average value A2 in the present trip is found at a distribution position $+0.5\sigma$ and an average value A3 in the present trip is found at a distribution position $-1.5\sigma$. The driving characteristics judgment unit 23 finds a distribution position in such a way for each parameter of each of the running scenes and running states.

If there is a parameter whose data pieces are not accumulated up to a minimum number, a parameter whose data pieces are accumulated to a minimum number is picked up to find its distribution position, and according to the found distribution position, a distribution position of the parameter whose data pieces are not accumulated to a minimum number is set. For example, if a velocity parameter has accumulated data pieces and its distribution position is $+1.5\sigma$, a time headway parameter is set at the distribution position $+1.5\sigma$ even if the number of data pieces accumulated for the time headway is less than a minimum. This is possible because the parameters have a correlation. For example, if the driver drives the vehicle in a hurry, there is a correlation that the velocity is higher than normal, the time headway to a preceding vehicle is shorter than normal, and the acceleration is high. On the contrary, if the driver slowly drives the vehicle, there is a correlation that the velocity is lower than normal, the time headway is longer than normal, and the acceleration is low. Accordingly, for a parameter whose data is not accumulated, it is possible to set a distribution position thereof according to the correlation. If a plurality of parameters have different distribution positions, an average value of the distribution positions may be found and applied to a parameter whose data is not accumulated. For example, if a plurality of parameters have distribution positions of $+1.4\sigma$, $+1\sigma$, $+0.8\sigma$, and $+1.2\sigma$, an average value of +1.1σ may be set for such a parameter. In this way, even if all parameters of all running scenes and running states do not have minimum numbers of data pieces, statistics of the present trip can be set.

Figure 12:
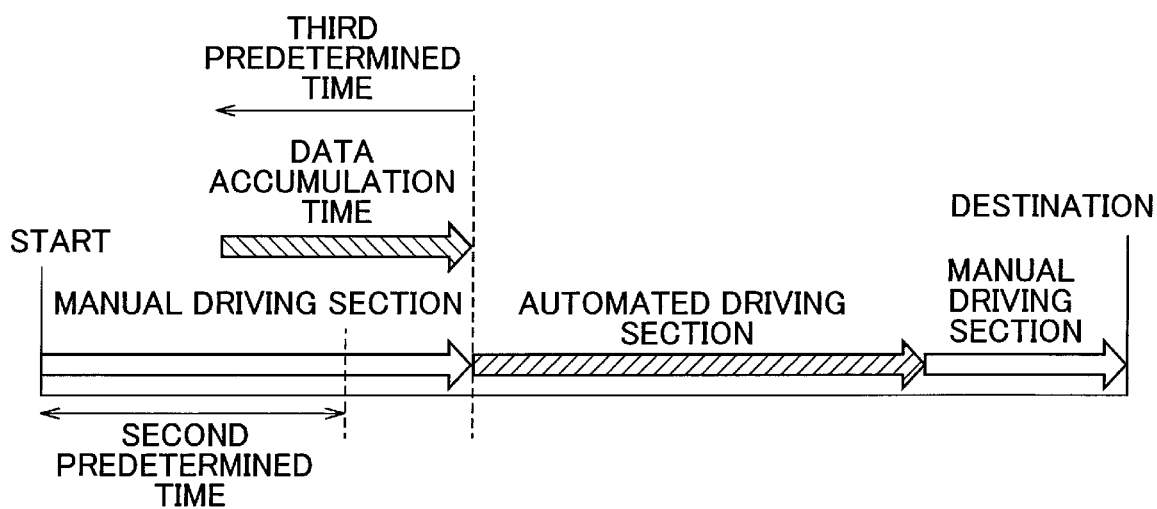
FIG. 12 is a view explaining a technique of acquiring data to judge driving characteristics in the driving characteristics determination process according to the first embodiment of the present invention.

Further, the driving characteristics judgment unit 23 may use, if a time for which manual driving is executed in the present trip is longer than a second predetermined time, data accumulated within a third predetermined time before a temporal point at which the manual driving is switched to automated driving. For example, as illustrated in FIG. 12, if manual driving is executed for a time that is sufficiently long to accumulate data, it is possible to use data accumulated within the third predetermined time before the temporal point at which the manual driving is switched to automated driving and find the driving characteristics of the manual driving in the present trip. With this, the data just before switching to automated driving can be used. Accordingly, the second predetermined time is set to a time to accumulate data that is sufficient to judge the driving characteristics of manual driving. The third predetermined time is set to a time to secure data pieces required for judging the driving characteristics of manual driving and is shorter than the second predetermined time.

In step S123, the driving characteristics determination unit 27 compares the driving characteristics of the present trip with the reference driving characteristics and judges whether or not there is a predetermined deviation between the driving characteristics of the present trip and the reference driving characteristics. More precisely, the driving characteristics determination unit 27 compares the statistics of the present trip with the statistics of the reference driving characteristics. For example, if a distribution position of the present trip exceeds the reference driving characteristics by ±1σ, it is judged that there is the predetermined deviation, and if it is less than ±1σ, it is judged that there is no predetermined deviation. Accordingly, in FIG. 11, if an average value of the present trip is A1 or A3, it is judged that there is the deviation, and if it is A2, it is judged that there is no deviation. If there is the predetermined deviation between the driving characteristics of the present trip and the reference driving characteristics, the process advances to step S125, and if there is no deviation between the driving characteristics of the present trip and the reference driving characteristics, to step S127.

Figure 13:
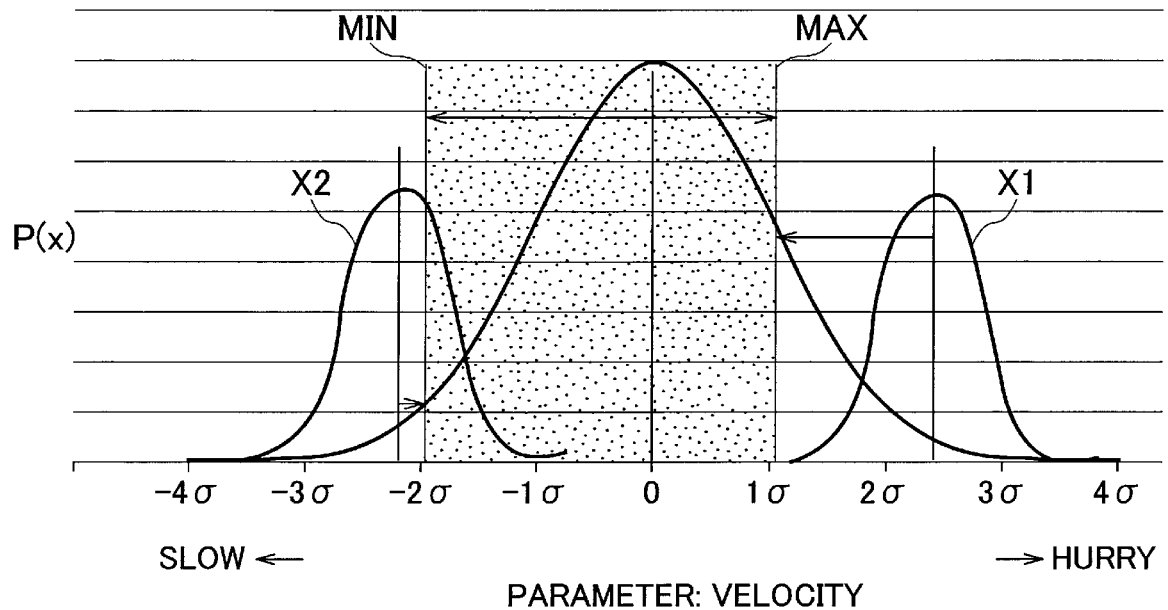
FIG. 13 is a view explaining a technique of determining driving characteristics applied to automated driving in the driving characteristics determination process according to the first embodiment of the present invention.

In step S125, the driving characteristics determination unit 27 sets, according to the driving characteristics of the present trip, driving characteristics applied to automated driving. The driving characteristics applied to automated driving are set within a predetermined range of the reference driving characteristics. For example, as illustrated in FIG. 13 in which a parameter is velocity, an upper limit value MAX is set at +1σ and a lower limit value MIN at −2σ, and within a range between the upper limit value MAX and the lower limit value MIN, the driving characteristics applied to automated driving are set. Accordingly, if the driving characteristics of the present trip are X1, the driving characteristics of automated driving are determined so that an average value of X1 becomes equal to the upper limit value MAX. In the automated driving, extremely rapid driving that may exceed +1σ lowers safety, and therefore, the driving characteristics are set to +1σ or lower that is slightly speedier than normal. On the other hand, if the driving characteristics of the present trip are X2, the driving characteristics of automated driving are set so that an average value of X2 is equal to the lower limit value MIN. In the automated driving, extremely slow driving equal to −2σ or lower may hinder traffic, and therefore, the driving characteristics are set to −2σ or over that is slower than normal, to secure a smooth traffic. If an average value of the driving characteristics of the present trip is equal to or greater than −2σ and lower than −1σ, the driving characteristics of the present trip may be applied as they are to automated driving. The range of the lower limit value MIN side is set to be wider than that of the upper limit value MAX side in consideration of safety. The driving characteristics setting technique illustrated in FIG. 13 is also applicable when vehicle-to-vehicle distance, acceleration, brake timing, or the like serves as a parameter.

Figure 14:
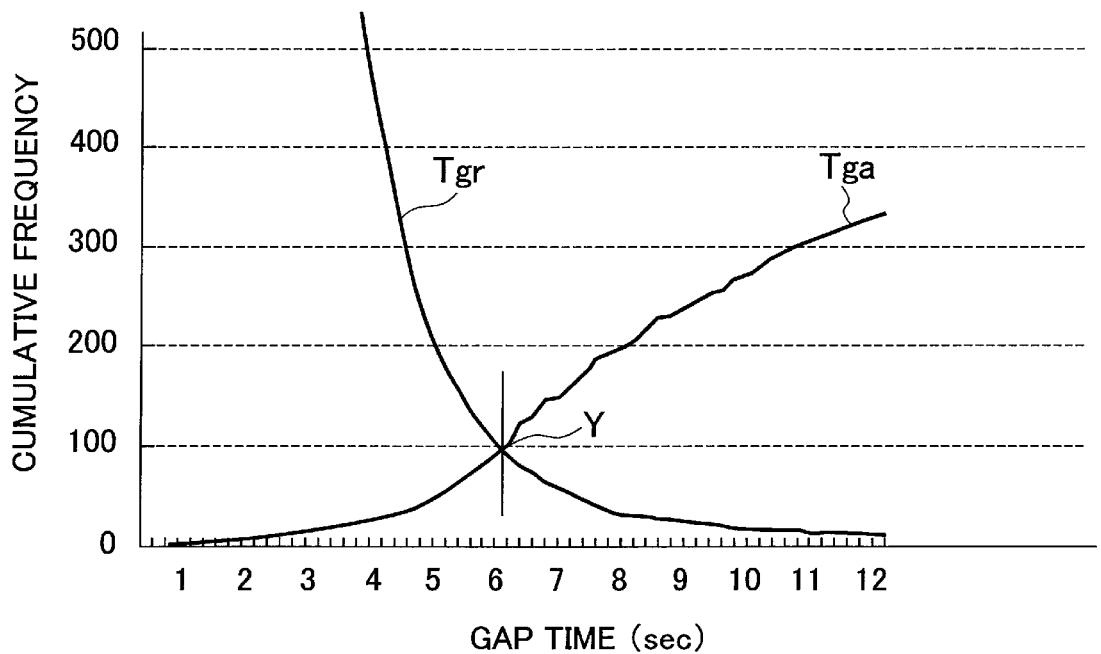
FIG. 14 is a view explaining a technique of setting a gap time applied to automated driving in the driving characteristics determination process according to the first embodiment of the present invention.

Further, a driving characteristics setting technique when a gap time serves as a parameter will be explained. First, gap time data at a right turn start point at an intersection illustrated in FIG. 4 and gap time data at an entering point to an intersection with a stop sign illustrated in FIG. 5 are respectively accumulated. A judgment to be made by the driver when turning right at an intersection will be a right turn execution or a right turn hold. A judgment to be made by the driver when entering an intersection with a stop sign will be an entering execution and an entering hold. FIG. 14 is a view illustrating an example of gap time accumulated for each judgment made at a right turn at an intersection. As illustrated in FIG. 14, Tga is a gap time when the driver executes a right turn and Tgr is a gap time when the driver holds a right turn. These gap times are accumulated to obtain cumulative frequency distributions, respectively. A gap time at which the cumulative frequency of the right-turn-execution gap time Tga equals to that of the right-turn-hold gap time Tgr (execution 50% and hold 50%) is a critical gap time Y, which is about six seconds in FIG. 14.

According to this result, a lower limit value for the right-turn-execution gap time of the driving characteristics applied to automated driving is determined. For example, if the gap time lower limit value is set to the critical gap time of six seconds, the automated driving always carries out a right turn at a gap time at which the driver usually carries out a right turn or over, so that the driver can get a safety feeling. If it is judged that the driving of the present trip is more in a hurry than normal, the lower limit value of the right-turn-execution gap time of automated driving is slightly lowered than the critical gap time. For example, it is set to a point where the right turn execution is 40% and the right turn hold 60% (about five seconds in FIG. 14). In such a hurry driving case, the gap time lower limit value is lowered to relieve a sense of urgency of the driver.

On the other hand, if it is judged that the driving of the present trip is slower than usual, the lower limit value of the right-turn-execution gap time of automated driving is slightly increased from the critical gap time. For example, it is set to a point where the right turn execution is 60% and right turn hold 40% (about seven seconds in FIG. 14). In such a slow driving case, the gap time lower limit value is increased to give the driver a feeling of having enough time.

If the parameter is a sideward-following-vehicle distance, a sideward-following-vehicle time, a vehicle-to-vehicle distance and time to pass another vehicle, or a sideward distance to a parked or stopped vehicle, driving characteristics can be set similar to the case of the gap time. Here, the sideward-following-vehicle distance will be explained as an example. First, data concerning the sideward-following-vehicle distance is accumulated, and according to the accumulated data and similar to the gap time, a lower limit of the sideward-following-vehicle distance is set for an instance when the vehicle merges with a lane or changes a lane. If it is judged that the driving of the present trip is more in a hurry than usual, the lower limit of the sideward-following-vehicle distance for an instance of merging with or changing a lane of automated driving is decreased. This can relieve a sense of urgency of the driver.

On the other hand, if it is judged that the driving of the present trip is slower than usual, the lower limit value of the sideward-following-vehicle distance for an instance of merging with or changing a lane is increased. This gives the driver a feeling of having enough time. Other parameters can similarly be set.

In step S127, the driving characteristics determination unit 27 sets the reference driving characteristics as the driving characteristics applied to automated driving. If the driving characteristics of the present trip are less than ±1σ, it is considered that the driver is in a usual state, and therefore, the reference driving characteristics are applied to automated driving.

In step S129, the automated driving control execution unit 29 determines, according to the environmental conditions recognized through the information acquisition unit 21, the behavior of the vehicle during running and executes automated driving according to the driving characteristics determined in step S125 or S127. At this time, the driving characteristics may be adjusted according to whether or not there is a passenger in the vehicle or the attributes of a passenger. Whether or not there is a passenger is detected with a pressure sensor arranged on a seat or a camera or sonar arranged in the vehicle. The attributes of a passenger are an elderly person, a children, a woman, and the like that are identified by a weight detected with a sensor arranged on a seat or by a camera or sonar arranged in the vehicle. Also, it is possible that the driver inputs whether or not there is a passenger and the attributes of a passenger. It is possible to identify the presence of a passenger or the properties of a passenger from a communication device such as a smartphone. If there is a passenger who is an elderly person, a child, or a pregnant woman, the automated driving control execution unit 29 adjusts the driving characteristics to lower a velocity, elongate a vehicle-to-vehicle distance, decrease acceleration, and quicken brake timing.

Also, it is possible to adjust the driving characteristics according to physical conditions of the driver. The physical conditions of the driver may be an awakening degree or a fatigue degree that is judged according to an eye closed time ratio by detecting an eye opened/closed state from a facial image of the driver photographed with a camera. Further, the fatigue degree may be judged with a pulse wave measuring device of wrist watch type or of fingertip attached type. The lower the awakening degree or the higher the fatigue degree, the slower the velocity, the longer the vehicle-to-vehicle distance, the lower the acceleration, and the quicker the brake timing the automated driving control execution unit 29 sets by adjusting the driving characteristics.

It is also possible to adjust the driving characteristics according to a desired arrival time to a destination inputted by the occupant of the vehicle. The desired arrival time is inputted such as 30 minutes from now to arrival at the destination, or arrival until 14:00 at the destination. If the occupant specifies a desired arrival time, the automated driving control execution unit 29 checks to see if the vehicle traveled the same route and same destination in the past. If the vehicle traveled so, it is checked to see if the occupant specified a desired arrival time at that occasion. If a desired arrival time was specified in the past, it is detected if the desired arrival time of this time is sooner or later than the past desired arrival time and the driving characteristics are adjusted accordingly. For example, if the desired arrival time of this time is sooner than the past desired arrival time, the driving characteristics are adjusted to increase upper limit values for an average velocity and acceleration. On the other hand, if the desired arrival time of this time is later than the past desired arrival time, the driving characteristics are adjusted to lower the upper limit values of the average velocity and acceleration.

In step S131, the automated driving control execution unit 29 judges whether or not the vehicle has arrived at the destination. If the vehicle has not arrived at the destination, step S133 is carried out, and if the vehicle has arrived at the destination, the driving characteristics determination process according to the embodiment ends.

In step S133, the reference driving characteristics storage unit 25 updates the reference driving characteristics by reflecting the data concerning the manual driving of the present trip to them and stores the updated ones. Then, the process returns to step S105 to continuously carry out the above-mentioned driving characteristics determination process.

[Effect of First Embodiment]

As explained above in detail, the driving control method and apparatus thereof according to the embodiment compare occupant's driving characteristics of manual driving in a present trip of a vehicle with reference driving characteristics. If a predetermined deviation occurs between the occupant's driving characteristics of manual driving in the present trip and the reference driving characteristics, driving characteristics applied to automated driving are set according to the occupant's driving characteristics of manual driving in the present trip. With this, if the occupant conducts, in the present trip, manual driving differing from usual one, occupant's driving characteristics of the manual driving in the present trip are reflected, prior to occupant's driving characteristics of past manual driving, to the automated driving. Accordingly, the automated driving can be executed according to driving characteristics desired for the present trip by the occupant of the vehicle.

According to the driving control method and apparatus thereof of the embodiment, data concerning manual driving in a past trip of the vehicle is accumulated, and according to the accumulated data, the reference driving characteristics are set. With this, driving characteristics close to usual manual driving conducted by the occupant of the vehicle can be set as the reference driving characteristics. Accordingly, if a deviation from the reference driving characteristics occurs, it is understood that the occupant wants driving characteristics differing from usual ones, and therefore, it is possible to correctly judge an intention of the occupant.

Further, according to the driving control method and apparatus thereof of the embodiment, when manual driving is switched to automated driving, driving characteristics chosen by the occupant of the vehicle are displayed on a display of the vehicle. With this, the driving characteristics chosen when switching manual driving to automated driving can be confirmed, and therefore, a sense of security of the occupant of the vehicle improves.

Also, according to the driving control method and apparatus thereof of the embodiment, if a time during which manual driving is executed in a present trip is longer than a second predetermined time, data accumulated in a third predetermined time before a time point of switching to automated driving is used to judge driving characteristics. With this, it is possible to judge driving characteristics of the present trip by using data just before switching to automated driving. In particular, when a time of manual driving is long, the driving characteristics of the manual driving may differ between a first half and a latter half thereof. To deal with this, data just before switching to automated driving is used to judge driving characteristics, thereby suppressing changes in driving characteristics and realizing smooth switching to automated driving.

In addition, according to the driving control method and apparatus thereof of the embodiment, judging the driving characteristics of a present trip does not use data accumulated within a fourth predetermined time after the start of running of the vehicle. With this, data during a period just after the start of running in which driving characteristics are unstable can be excluded, and therefore, the driving characteristics of the present trip can correctly be judged. In particular, driving characteristics just after the start of running hardly cause a deviation from the reference driving characteristics, and therefore, using the data obtained after elapsing the fourth predetermined time allows to easily identify a deviation from the reference driving characteristics.

Also, according to the driving control method and apparatus thereof of the embodiment, driving characteristics applied to automated driving are adjusted according to at least one of the presence of a passenger in the vehicle and the attributes of a passenger. With this, driving characteristics conforming to a passenger can be provided for automated driving.

Also, according to the driving control method and apparatus thereof of the embodiment, the occupant of the vehicle adjusts the driving characteristics applied to automated driving according to a desired arrival time to a desired destination. With this, driving characteristics satisfying an intention of the occupant of the vehicle can be provided for the automated driving.

Also, according to the driving control method and apparatus thereof of the present invention, the driving characteristics applied to automated driving are adjusted depending on physical conditions of the driver of the vehicle. With this, driving characteristics conforming to the physical conditions of the driver of the vehicle can be provided for the automated driving.

Also, according to the driving control method and apparatus thereof of the embodiment, data concerning manual driving of the vehicle is accumulated in a server outside the vehicle. This eliminates the need of accumulating data in the vehicle, thereby reducing the capacity of a storage device installed in the vehicle.

In addition, according to the driving control method and apparatus thereof of the embodiment, the driving characteristics applied to automated driving are set within a predetermined range of the reference driving characteristics. This prevents the driving characteristics of the automated driving from being extreme characteristics and provides the occupant of the vehicle with a sense of security.

Also, according to the driving control method and apparatus thereof of the embodiment, data concerning a vehicle velocity, a vehicle-to-vehicle distance, time headway, or relative velocity between the vehicle and a preceding vehicle, a brake timing of the vehicle, and an acceleration of the vehicle are accumulated. In addition, data concerning a gap time between the vehicle and an oncoming or crossing vehicle, a distance or time between the vehicle and a sideward-following vehicle, and a sideward distance between the vehicle and a parked or stopped vehicle are accumulated. With this, in various running scenes and running states, driving characteristics of the present trip can be judged.

Also, according to the driving control method and apparatus of the embodiment, a request from the occupant of the vehicle is received through a switch operation, to adjust the driving characteristics applied to automated driving. This enables the driving characteristics of the automated driving to be adjusted to those required by the occupant of the vehicle.

Further, according to the driving control method and apparatus thereof of the embodiment, an operation history of switch operations of the occupant of the vehicle is accumulated as data to judge driving characteristics of the present trip. This enables a driver's intention to be reflected to judging the driving characteristics of the present trip.

Second Embodiment

Figure 15:
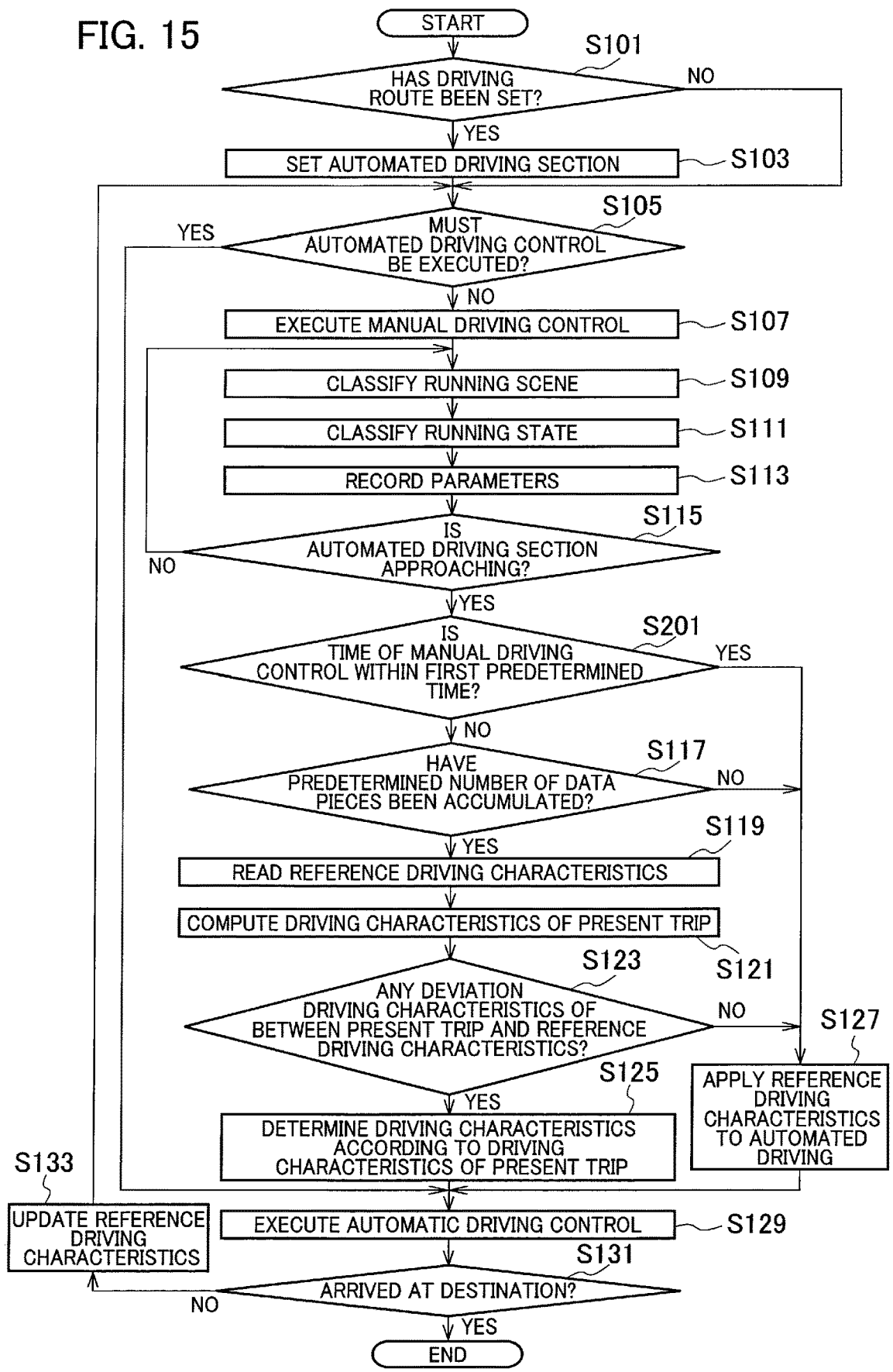
FIG. 15 is a flowchart illustrating processing steps of a driving characteristics determination process performed by the driving control apparatus according to a second embodiment of the present invention.

Hereunder, a second embodiment according to the present invention will be explained with reference to the drawings. A driving characteristics determination process of this embodiment differs from that of the first embodiment in that, if a time during which manual driving is executed in a present trip is within a first predetermined time, reference driving characteristics are applied to execute automated driving. Accordingly, the driving characteristics determination process of this embodiment illustrated in FIG. 15 adds a process of step S201 and this differs from the driving characteristics determination process of the first embodiment illustrated in FIG. 8. The constitution of a driving control system and process steps other than step S201 of the embodiment are the same as those of the first embodiment, and therefore, detailed explanations thereof are omitted.

Hereunder, the process of step S201 that differs from the first embodiment will be explained. In step S201, the automated driving control execution unit 29 judges whether or not a time during which manual driving is executed in the present trip is within the first predetermined time. If the time of executing manual driving is too short, it is impossible to accumulate data sufficient to judge the driving characteristics of the manual driving. To deal with this, it is judged whether or not the time of executing manual driving is within the first predetermined time, thereby judging whether or not data necessary for judging the driving characteristics of the manual driving has been accumulated. Accordingly, the first predetermined time is set to a time in which data to judge the driving characteristics of manual driving is not sufficiently accumulated. If the executing time of manual driving exceeds the first predetermined time, step S117 is executed, and if it is within the first predetermined time, step S127 is executed. Namely, if the executing time of manual driving is too short to accumulate sufficient data to judge the driving characteristics of the manual driving, step S127 is carried out to apply the reference driving characteristics to the driving characteristics of automated driving.

Figure 16:
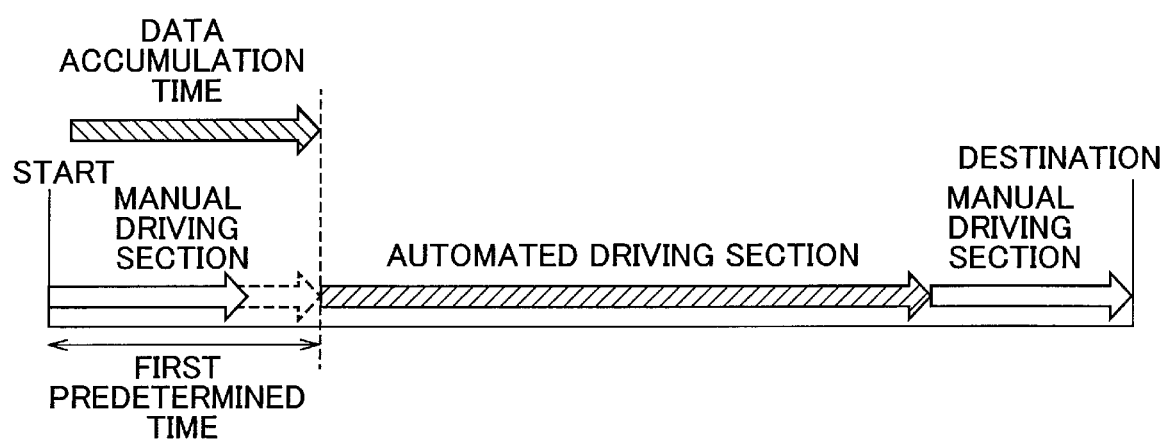
FIG. 16 is a view explaining a technique of acquiring data to judge driving characteristics in the driving characteristics determination process according to the second embodiment of the present invention.

If the executing time of manual driving is within the first predetermined time, an adjustment may be made to delay the start of automated driving until the first predetermined time elapses. As illustrated in FIG. 16, if the a manual driving section is within the first predetermined time, the start of automated driving is delayed until the first predetermined time passes, thereby extending the manual driving section and securing a time for accumulating data. At this time, it is possible to control to provide a message such as "Continue manual driving a little longer?" and obtain an approval of the occupant of the vehicle.

[Effect of Second Embodiment]

As explained above in detail, the driving control method and apparatus thereof of this embodiment executes automated driving by applying reference driving characteristics thereto, if a time during which manual driving is executed in a present trip is within a first predetermined time. With this, if the executing time of manual driving is too short to accumulate sufficient data, the automated driving is carried out according to usual driving characteristics to give the driver a sense of security.

Third Embodiment

Figure 17:
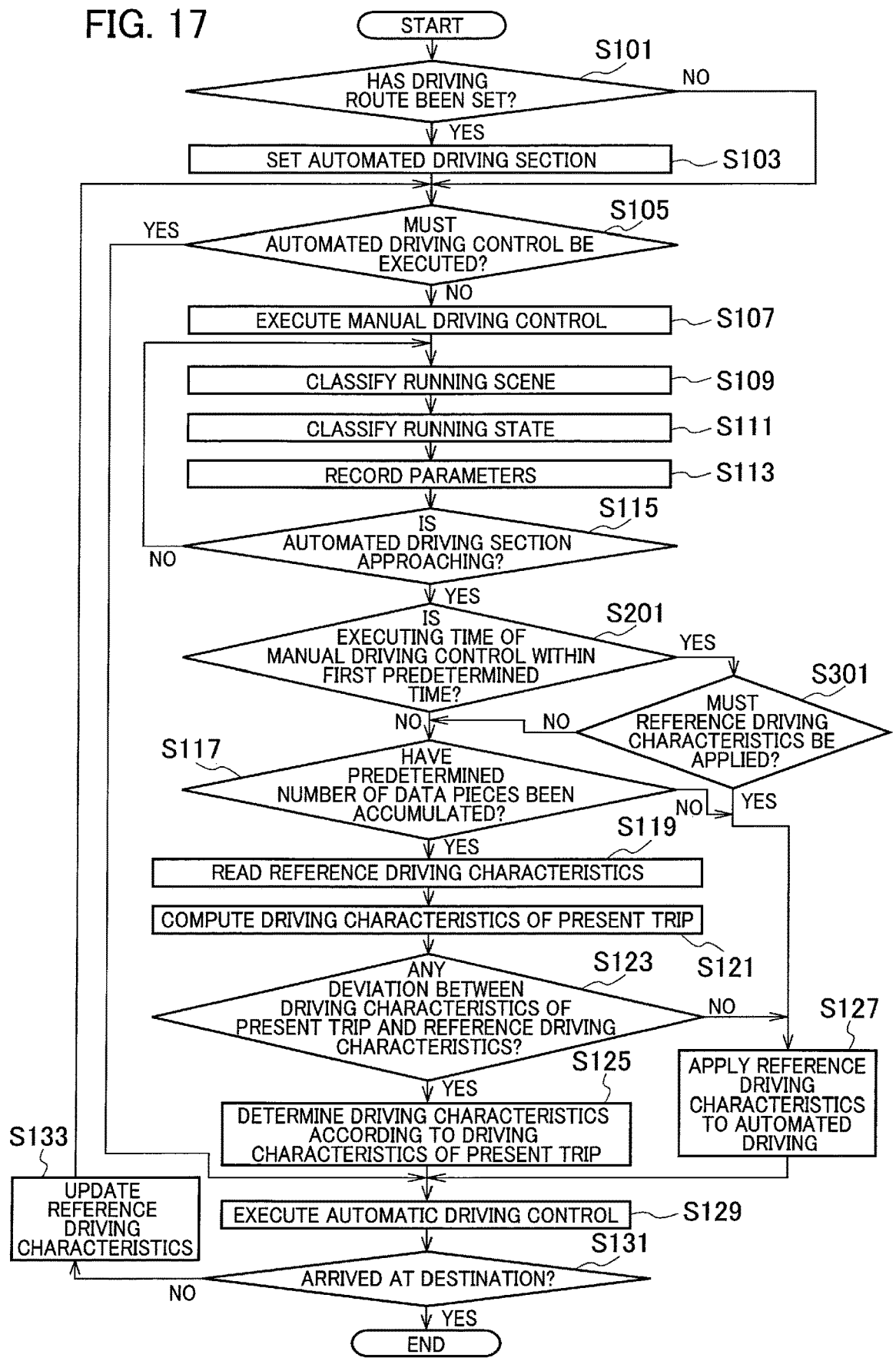
FIG. 17 is a flowchart illustrating processing steps of a driving characteristics determination process performed by the driving control apparatus according to a third embodiment of the present invention.

Hereunder, a third embodiment according to the present invention will be explained with reference to the drawings. A driving characteristics determination process of this embodiment differs from that of the second embodiment in that it makes the occupant of the vehicle choose, if a time during which manual driving is executed in a present trip is within a first predetermined time, driving characteristics of the present trip or reference driving characteristics, and adopts the chosen driving characteristics to execute automated driving. Accordingly, the driving characteristics determination process of this embodiment illustrated in FIG. 17 adds a process of step S301 and this is different from the driving characteristics determination process of the second embodiment illustrated in FIG. 15. The constitution of a driving control system and steps other than step S301 of this embodiment are the same as those of the second embodiment, and therefore, their detailed explanations are omitted.

Hereunder, the process of step S301 that is different from the second embodiment will be explained. In step S201, if it is judged that the executing time of manual driving in the present trip is within the first predetermined time, the automated driving control execution unit 29 asks the occupant of the vehicle, in step S301, whether or not the reference driving characteristics must be applied. For example, a message is presented to make the occupant of the vehicle choose whether driving characteristics of the present trip must be applied or whether driving characteristics of a past trip must be applied. If the reference driving characteristics are not chosen and the driving characteristics of the present trip are chosen, step S117 is carried out, and if the reference driving characteristics are chosen, step S127 is carried out. Thereafter, when switching to automated driving, the chosen driving characteristics are displayed on the display 11.

[Effect of Third Embodiment]

As explained above in detail, the driving control method and apparatus thereof according to this embodiment makes an occupant of a vehicle choose driving characteristics of a present trip or reference driving characteristics, if a time during which manual driving is executed in the present trip is within a first predetermined time and executes automated driving by applying the chosen driving characteristics thereto. With this, even if the executing time of manual driving is too short to accumulate sufficient data, the automated driving can be executed according to the driving characteristics desired by the occupant of the vehicle.

In the above-mentioned embodiments, a period for executing automated driving is set. The embodiments are applicable when the period for executing automated driving is not set and automated driving is started upon a request made by an occupant. When the period for executing automated driving is not set and automated driving is started upon a request made by an occupant, it is possible to judge, at the start of automated driving, whether driving characteristics to be applied are driving characteristics of a present trip or reference driving characteristics. In combination with the above-mentioned embodiments, it is possible to apply to the case in which the period for executing automated driving is not set and automated driving is started in response to a request made by an occupant.

According to the embodiments, concerning the occupant's driving characteristics of manual driving in a present trip, it is not always necessary that the occupant controls all of control objects of the vehicle. It is possible to detect the occupant's driving characteristics of manual driving in the present trip from among control objects that are controlled by the occupant. Namely, only for a control object controlled by the occupant, the occupant's driving characteristics of manual driving in the present trip may be compared with reference driving characteristics, and if a deviation occurs between them, driving characteristics applied to automated driving can be set for the control object controlled by the occupant according to the occupant's driving characteristics of manual driving in the present trip.

The above-mentioned embodiments are examples of the present invention. Accordingly, the present invention is not limited to the above-mentioned embodiments and any configurations other than the embodiments or various modifications to be made depending on designing naturally fall within the scope of the present invention if not departing from the technical idea of the present invention.

DESCRIPTION OF REFERENCE NUMERALS

1: Driving control apparatus
3: Running state detection unit
5: Environmental conditions detection unit
7: Driving changeover switch
9: Driving characteristics adjustment unit
11: Display
13: Control state display module
15: Actuator control module
17: Actuator
21: Information acquisition unit
23: Driving characteristics judgment unit
25: Reference driving characteristics storage unit
27: Driving characteristics determination unit
29: Automated driving control execution unit
50: Vehicle
51: CAN
53: Navigation device
55: Camera
57: Laser radar
59: Communication device
61: Server
100: Driving control system

The invention claimed is:

1. A driving control method for a driving control apparatus to set driving characteristics applied to automated driving in a vehicle that is capable of switching manual driving to run the vehicle according to driving operations of an occupant and the automated driving to automatically run the vehicle from one to another, comprising:
comparing occupant's driving characteristics of manual driving in a present trip of the vehicle with reference driving characteristics stored in advance, and in a case where a predetermined deviation occurs between the occupant's driving characteristics of manual driving in the present trip and the reference driving characteristics, setting the driving characteristics applied to the automated driving according to the occupant's driving characteristics of manual driving in the present trip; and
if a time during which the manual driving is executed in the present trip is within a first predetermined time, the reference driving characteristics are applied to execute the automated driving.

2. The driving control method as set forth in claim 1, characterized in that occupant's driving characteristics of manual driving in a past trip of the vehicle are set as the reference driving characteristics.

3. The driving control method as set forth in claim 1, characterized in that, if the time during which the manual driving is executed in the present trip is longer than a second predetermined time, data accumulated within a third predetermined time that is shorter than the second predetermined time and is before a time point at which the manual driving is switched to the automated driving is used to set the occupant's driving characteristics of manual driving in the present trip.

4. The driving control method as set forth in claim 1, characterized in that the occupant's driving characteristics of manual driving in the present trip do not use data accumulated within a fourth predetermined time after the start of running of the vehicle.

5. The driving control method as set forth in claim 1, characterized in that the driving characteristics applied to the automated driving are adjusted according to at least whether or not there is a passenger in the vehicle or the attributes of the passenger.

6. The driving control method as set forth in claim 1, characterized in that the driving characteristics applied to the automated driving are adjusted according to a desired arrival time to a destination desired by the occupant of the vehicle.

7. The driving control method as set forth in claim 1, characterized in that the driving characteristics applied to the automated driving are adjusted according to physical conditions of the driver of the vehicle.

8. The driving control method as set forth in claim 1, characterized in that data concerning the occupant's driving characteristics of manual driving is accumulated in a server outside the vehicle.

9. The driving control method as set forth in claim 1, characterized in that data concerning the occupant's driving characteristics of manual driving in the present trip is at least one among the velocity of the vehicle, a vehicle-to-vehicle distance between the vehicle and a preceding vehicle, a time headway or a relative velocity, the brake timing of the vehicle, the acceleration of the vehicle, a gap time between the vehicle and an oncoming vehicle or a crossing vehicle, a vehicle-to-vehicle distance or time between the vehicle and a sideward-following vehicle, and a sideward distance between the vehicle and a parked or stopped vehicle.

10. The driving control method as set forth in claim 1, characterized in that the driving characteristics applied to the automated driving are adjusted according to a request from the occupant of the vehicle.

11. The driving control method as set forth in claim 10, characterized in that a history of request from the occupant of the vehicle is accumulated as data concerning the occupant's driving characteristics of manual driving in the present trip.

12. A driving control method for a driving control apparatus to set driving characteristics applied to automated driving in a vehicle that is capable of switching manual driving to run the vehicle according to driving operations of an occupant and the automated driving to automatically run the vehicle from one to another, comprising:
comparing occupant's driving characteristics of manual driving in a present trip of the vehicle with reference driving characteristics stored in advance; and
if a predetermined deviation occurs between the occupant's driving characteristics of manual driving in the present trip and the reference driving characteristics, setting, according to the occupant's driving characteristics of manual driving in the present trip, the driving characteristics applied to the automated driving, wherein
the driving characteristics applied to the automated driving are set within a predetermined range of the reference driving characteristics, and
if a time during which the manual driving is executed in the present trip is within a first predetermined time, the occupant of the vehicle is prompted to choose the occupant's driving characteristics of manual driving in the present trip or the reference driving characteristics and the chosen driving characteristics are applied to execute the automated driving.

13. The driving control method as set forth in claim 12, characterized in that, when the manual driving is switched to the automated driving, the driving characteristics chosen by the occupant of the vehicle are displayed on a display of the vehicle.

14. A driving control apparatus to set driving characteristics applied to automated driving in a vehicle that is capable of switching manual driving to run the vehicle according to driving operations of an occupant and the automated driving from one to another, comprising:
a controller comparing occupant's driving characteristics of manual driving in a present trip of the vehicle with reference driving characteristics stored in advance, and in a case where a predetermined deviation occurs between the occupant's driving characteristics of manual driving in the present trip and the reference driving characteristics, setting the driving characteristics applied to the automated driving according to the occupant's driving characteristics of manual driving in the present trip, wherein
if a time during which the manual driving is executed in the present trip is within a first predetermined time, the reference driving characteristics are applied to execute the automated driving.

15. A driving control apparatus to set driving characteristics applied to automated driving in a vehicle that is capable of switching manual driving to run the vehicle according to driving operations of an occupant and the automated driving from one to another, comprising:
a controller configured to:
compare occupant's driving characteristics of manual driving in a present trip of the vehicle with reference driving characteristics stored in advance; and
in a case where a predetermined deviation occurs between the occupant's driving characteristics of manual driving in the present trip and the reference driving characteristics, setting the driving characteristics applied to the automated driving according to the occupant's driving characteristics of manual driving in the present trip,
wherein the driving characteristics applied to the automated driving are set within a predetermined range of the reference driving characteristics, and
if a time during which the manual driving is executed in the present trip is within a first predetermined time, the occupant of the vehicle is prompted to choose the occupant's driving characteristics of manual driving in the present trip or the reference driving characteristics and the chosen driving characteristics are applied to execute the automated driving.

* * * * *